United States Patent [19]
Izumimoto et al.

[11] Patent Number: 4,762,722
[45] Date of Patent: Aug. 9, 1988

[54] SEALED PACKAGE OF RAW MEAT OR FISH AND METHOD OF PRESERVING RAW MEAT OR FISH

[75] Inventors: Masatoshi Izumimoto, Obihiro; Syuji Wakamatsu; Megumu Yuyama, both of Tokyo, all of Japan

[73] Assignee: Mitsubishi Gas Chemical Company, Inc., Japan

[21] Appl. No.: 70,666

[22] Filed: Jul. 6, 1987

Related U.S. Application Data

[63] Continuation of Ser. No. 721,679, Apr. 10, 1985, abandoned.

[30] Foreign Application Priority Data

Apr. 16, 1984 [JP] Japan ............................... 59-76374

[51] Int. Cl.⁴ .................... A23B 4/00; B65D 81/20; C09K 15/02
[52] U.S. Cl. .................... 426/124; 426/129; 426/418; 426/398; 252/188.28; 502/406
[58] Field of Search ............... 426/129, 418, 316, 124, 426/118, 395, 398; 502/406; 252/188.28

[56] References Cited

U.S. PATENT DOCUMENTS

| | | | |
|---|---|---|---|
| 2,772,172 | 11/1956 | Carson | 426/129 |
| 3,102,777 | 9/1963 | Bedrosian et al. | 426/418 |
| 3,102,780 | 9/1963 | Bedrosian et al. | 426/418 |
| 3,122,748 | 2/1964 | Beebe | 426/129 |
| 3,419,400 | 12/1968 | Nayhurst et al. | 426/124 |
| 3,574,642 | 4/1971 | Weinke | 426/129 |
| 3,670,874 | 6/1972 | Brunner | 426/129 |
| 3,681,092 | 8/1972 | Titchenal | 426/124 |
| 4,055,672 | 10/1977 | Hirsch et al. | 426/418 |
| 4,113,652 | 9/1978 | Yoshikawa et al. | 426/124 |
| 4,166,807 | 9/1979 | Komatsu et al. | 426/124 |
| 4,192,773 | 3/1980 | Yoshikawa et al. | 426/124 |
| 4,299,719 | 11/1981 | Aoki et al. | 252/188.28 |
| 4,384,972 | 5/1983 | Nakamura et al. | 426/124 |
| 4,399,161 | 8/1983 | Nakamura et al. | 426/418 |
| 4,522,835 | 6/1985 | Woodruff et al. | 426/418 |

FOREIGN PATENT DOCUMENTS

| | | | |
|---|---|---|---|
| 1379263 | 1/1975 | Fed. Rep. of Germany | 426/129 |
| 2538681 | 3/1977 | Fed. Rep. of Germany | 426/418 |
| 51-104061 | 9/1976 | Japan . | |
| 51-105989 | 9/1976 | Japan | 426/124 |
| 52-3856 | 1/1977 | Japan . | |
| 54-41355 | 4/1979 | Japan . | |
| 54-137491 | 10/1979 | Japan | 426/418 |
| 54-34821 | 10/1979 | Japan | 426/124 |
| 54-157866 | 12/1979 | Japan | 426/129 |
| 55-12010 | 1/1980 | Japan | 426/118 |
| 56-164007 | 12/1981 | Japan | 426/124 |
| 56-164006 | 12/1981 | Japan | 426/124 |
| 58-47430 | 3/1983 | Japan | 426/324 |
| 58-81732 | 5/1983 | Japan | 426/324 |
| 58-107134 | 6/1983 | Japan | 426/324 |
| 58-158129 | 9/1983 | Japan . | |

OTHER PUBLICATIONS

J. of Agricultural Food Chem., vol. 23, #6, p. 1208 plus.
Food Technology, 4/55, pp. 194–196.
Broiler Industry, 6/76, p. 14 plus.

*Primary Examiner*—Steven Weinstein
*Attorney, Agent, or Firm*—Leydig, Voit & Mayer

[57] ABSTRACT

A sealed package for inhibiting the oxidation and spoilage of raw meat or fish, while maintaining the scarlet color of the raw meat or fish. This package comprises an impermeable vessel housing a deoxidant-$CO_2$ generating agent composition together with the raw meat or fish. The deoxidant-$CO_2$ generating agent composition is selected to generate $CO_2$ gas immediately after the initiation of $O_2$ absorption at the rate of 0.2 to 2 mols per mol of $O_2$ absorbed.

5 Claims, 2 Drawing Sheets

SEALED PACKAGE OF RAW MEAT OR FISH AND METHOD OF PRESERVING RAW MEAT OR FISH

This application is a continuation of application Ser. No. 721,679, filed Apr. 10, 1985, now abandoned.

BACKGROUND OF THE INVENTION (a) Field of the Invention

The present invention relates to a sealed package of raw meat or fish which is capable of maintaining a reddish color, i.e., an indication of the freshness of raw meat or fish, and of inhibiting the oxidation and spoilage of raw meat or fish, and to a method of preserving raw meat or fish without losing the freshness thereof.

(b) Description of the Prior Art

A so-called "red meat or fish" presents a scarlet color while fresh, but turns, for example, brown as the freshness is lost. The red color of the meat or fish while fresh is due to myoglobin or hemoglobin, myoglobin generally occupying 80 to 90%. Myoglobin present in the meat is combined with oxygen in the air to form oxymyoglobin. If oxymyoglobin is oxidized to metmyoglobin, the meat turns brown.

The meat packed in the conventional method is readily exposed to the oxygen in the air during transportation, resulting in change or fading of the meat's color, oxidation of the lipid portion and spoilage of the meat, thereby shortening the storage life thereof. For example, chilled beef is generally packed with a shrinkable film of EVA/PVDC/EVA. In this case, the packed beef is exposed to the oxygen remaining in the package or permeating through the film, resulting in change or fading of the meat's color, oxidation of its lipid portion and spoilage of the packed beef.

To overcome the above-noted defect, a method of preserving raw meat is provided in which the raw meat is packed with a gas-impermeable material and a deoxidant is sealed in the package. The conventional method of preserving raw meat utilizing a deoxidant is disclosed in, for example, Japanese Patent Disclosure (Kokai) No. 51-104061, Japanese Patent Publication (Kokoku) No. 54-34822, Japanese Patent Disclosure (Kokai) No. 58-158129, Japanese Patent Disclosure (Kokai) No. 58-183033, and Japanese Patent Disclosure (Kokai) No. 54-41355. In the prior art of this type, myoglobin, i.e., the red component of raw meat, remains in its reduced state by the deoxidation effect. When the package is unsealed, the raw meat is exposed to the oxygen in the air, with the result that the reddish purple of the reduced myoglobin is changed into scarlet of the oxidized myoglobin.

What should be noted is that it is unavoidable for the raw meat to be turned reddish purple or reddish black even in the absence of oxygen. Specifically, the metmyoglobin, which displays a brown color, in the raw meat after the deoxidation is reduced to reduced myoglobin, which displays a reddish purple color, under the action of a metmyoglobin reduction enzyme. It follows that the raw meat packed together with the deoxidant is kept reddish purple because of the presence of the reduced myoglobin in the package.

Japanese Patent Disclosure 54-41355 referred to previously teaches the use of a deoxidant which generates carbon dioxide gas. In this case, freshness of the raw meat under preservation is maintained by the bacteriostatic effect of the carbon dioxide gas. However, the deoxidant used in this prior art generates carbon dioxide gas after the oxygen within the package has been absorbed, not immediately after initiation of the oxygen absorption. It follows that, if the $CO_2$-generating type deoxidant is used for preservation of raw meat, oxygen is selectively absorbed in the initial stage, resulting in a low oxygen concentration within the package and, thus, in a change of color of the raw meat to brown. It should be noted that, even if the raw meat whose color has been turned brown is exposed to carbon dioxide gas, it is impossible to restore the original scarlet color of the raw meat.

SUMMARY OF THE INVENTION

An object of the present invention is to provide a sealed package of raw meat or fish, which is capable of maintaining a scarlet color of the fresh raw meat or fish even in the absence of oxygen and of inhibiting the oxidation and spoilage of raw meat or fish, thereby keeping its original high quality over a long period of time, and a method of preserving raw meat or fish without losing the freshness thereof. The present invention makes it possible to overcome the above-noted defects inherent in the prior art utilizing a deoxidant. Specifically, the raw meat or fish preserved in the present invention is prevented from turning reddish purple or reddish black during the preservation even in the absence of oxygen.

According to the present invention, there is provided a sealed package of raw meat or fish comprising a substantially impermeable vessel, raw meat or fish housed in the vessel, and a deoxidant-$CO_2$ generating agent composition housed in the vessel, characterized in that the deoxidant-$CO_2$ generating agent composition generates $CO_2$ gas within the vessel immediately after initiation of the oxygen absorption at the rate of 0.2 to 2 mols per mol of the oxygen gas absorption.

In the present invention, the sealed package of raw meat or fish is preserved under an atmosphere of 10° C. or less.

DETAILED DESCRIPTION OF THE PREFERRED EMBODIMENTS

As a result of extensive research on the method of preserving raw meat or fish packed together with a deoxidant to prevent color fading of the raw meat or fish, the present inventors have found that it is possible to maintain the red color inherent in the fresh raw meat or fish during the preservation, if $CO_2$ gas is generated within the package to lower the oxygen concentration within the package, leading to the present invention. Specifically, the present inventors have found that, where the $CO_2$ gas concentration is increased within the package, the raw meat or fish under preservation is unlikely to turn brown even if the oxygen concentration within the package is lowered in accordance with oxygen absorption by the deoxidant, with the result that the vivid red of the oxygen type myoglobin can be maintained for a long period of time even after the deoxidation.

Figure 1:
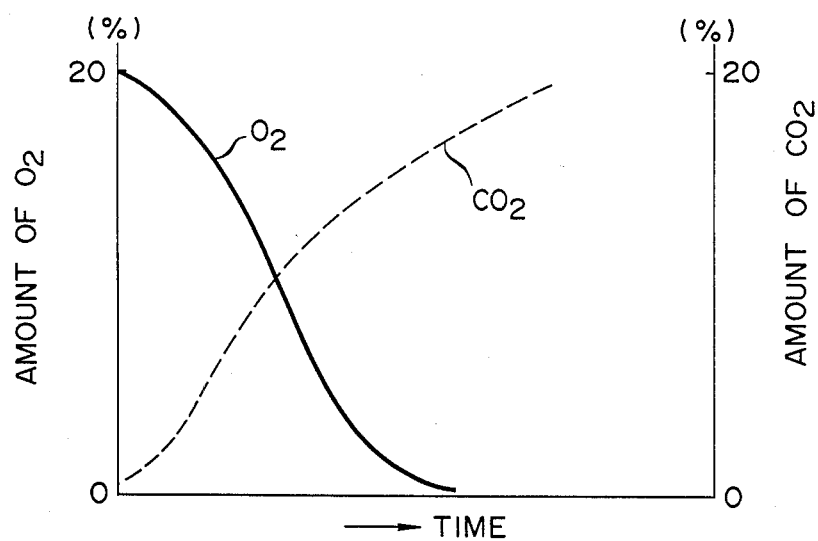
FIG. 1 is a graph showing the relationship between the oxygen absorption rate and the $CO_2$ gas generation rate within the sealed package of raw meat or fish according to the present invention.

The $CO_2$-generating type deoxidant composition used in the present invention generates $CO_2$ immediately after initiation of $O_2$ absorption as exemplified in FIG. 1. Specifically, the $CO_2$ gas is generated at least before the $O_2$ concentration is lowered to a level at which the raw meat or fish is turned brown. The $CO_2$ gas should desirably be generated at the rate of at least 0.2 mol per mol of the $O_2$ absorption, preferably, at the rate of 0.5 to 2 mols per mol of the $O_2$ absorption. If the $CO_2$ gas generation rate is higher than 2 mols per mol of the $O_2$ gas absorption, undesirable effects are brought about. For example, the packaging vessel is markedly deformed.

It may be thought desirable to seal $CO_2$ gas in the packaging step of the raw meat or fish. In this case, however, it has been experimentally confirmed that the color change of the preserved meat or fish to brown is promoted.

It is absolutely necessary for the deoxidant-$CO_2$ generating agent composition used in the present invention to contain a deoxidant and a $CO_2$ gas generating agent. The composition may also contain deodorizers such as activated carbon and zeolite, adsorbents, pH buffering agents, catalysts, etc. as required.

The deoxidants used in the present invention include, for example, reducible inorganic salts and elements such as iron powder, dithiofite, sulfite, and ferrous salt; reducible organic compounds such as hydroquinone; catechol; resorcinol; and reducible polyalcohols such as ascorbic acid, erythorbic acid, salts thereof, and glucose. The amount of the deoxidant should be controlled such that the oxygen absorption within the package is completed, i.e., the oxygen concentration within the package is rendered less than 0.1%, in 2 days at 25° C. or in 5 days at 5° C.

The $CO_2$ gas generating agents used in the present invention include, for example, carbonates or bicarbonates of alkali metals and alkaline earth metals. It is also desirable for controlling the generation rate of the carbon dioxide gas to add a pH buffering agent such as a solid acid, e.g., citric acid, fumaric acid or phosphate.

The deoxidant-$CO_2$ generating agent composition may be sealed in a gas-permeable bag in an actual usage thereof. In this case, the deoxidant component may be disposed within the bag as separated from or mixed with the $CO_2$ gas generating component.

Exemplified in the following are the deoxidant-$CO_2$ generating agent compositions used in the present invention:

COMPOSITION 1

| Component | Amount (parts by wt) |
| --- | --- |
| L-ascorbic acid or sodium L-ascorbate | 100 |
| $NaHCO_3$ or $Na_2CO_3$ | 30 to 250 |
| $FeSO_4.7H_2O$ or $FeCl_2$ (catalyst) | 10 to 100 |
| Carbon Black or Activated Carbon | 50 to 200 |
| Water | 1 to 10 |

COMPOSITION 2

| Component | Amount (parts by wt) |
| --- | --- |
| Fe type deoxidant | 100 |
| Metal halide | 5 to 100 |
| $NaHCO_3$ | 10 to 500 |
| Fumaric acid | 5 to 200 |
| Glycine | 10 to 200 |
| Activated carbon or zeolite | 10 to 500 |

COMPOSITION 3

(An example of the deoxidant component used separately from the $CO_2$ gas generating component within a gas-permeable bag.)

(1) Deoxidant Composition

| Component | Amount (parts by weight) |
| --- | --- |
| Fe | 100 |
| NaCl | 0.2 to 10 |
| $H_2O$ | 10 to 30 |
| Activated Carbon | 0.2 to 2 |
| Zeolite | 20 to 100 |

(2) $CO_2$ Gas Generating composition

| Component | Amount (parts by weight) |
| --- | --- |
| $NaHCO_3$ | 100 |
| Citric acid | 0.5 to 5 |

The deoxidant-$CO_2$ generating agent composition used in the present invention is tightly wrapped in a permeable film and housed in a package together with the raw meat or fish to be preserved. The permeable film mentioned is formed of a permeable plastic material, paper, cloth, nonwoven fabric or a laminate thereof.

The vessel hermetically housing the raw meat or fish together with the deoxidant-$CO_2$ generating agent composition is formed of a material which is substantially impermeable to gases, e.g., a material having an oxygen permeability of 100 ml/m$^2$ atm d (20° C.) or less. The materials meeting this requirement include, for example, a polyvinylidene chloride film, and a laminate consisting of a polyvinylidene chloride film and another synthetic resin film or a metal foil. In terms of the mechanical strength of the vessel, it is desirable to use a biaxially oriented film or a laminate thereof. A heat seal is generally employed for preparing a hermetic vessel. However, it is also possible to use a sealing member. The hermetic vessel may comprise a plastic tray and a lid both capable of molding and heat sealing. The lid may be hermetically sealed to the tray using an impermeable film or sheet. Alternatively, a hermetic plastic or metal container may be used in the present invention as the vessel for housing the raw meat or fish and the deoxidant-$CO_2$ generating agent composition.

In the present invention, the package of raw meat or fish is preserved generally at low temperatures, e.g., at 10° C. or less. Naturally, it is necessary to select a deoxidant-$CO_2$ generating agent composition which exhibits the particular effect of the present invention under such low temperatures.

As described above, the sealed package of the present invention permits preserving red butcher's meat such as pork, beef and horsemeat, as well as red fish such as tuna and bonito over a long period of time without losing their scarlet colors.

EXAMPLE 1

100 g of minced beef was packed in a plastic tray together with a deoxidant-$CO_2$ generating agent composition shown in Table 1 below. The package was hermetically wrapped in an impermeable laminate film of KON (nylon coated with vinylidene chloride)/PE (polyethylene) and preserved at 5° C. The amount of $O_2$ initially present within the package was 20% by volume.

In this experiment, the deoxidant-$CO_2$ generating agent composition was added with 6 parts by weight of water and mixed. Then, 5 g of the mixture was sealed in a gas permeable bag.

TABLE 1

| (Deoxidant—$CO_2$ Generating Agent Composition) | |
|---|---|
| Component | Amount (parts by wt) |
| Sodium ascorbate | 10 |
| Carbon black | 10 |
| $Na_2CO_3$ | 5 |
| $NaHCO_3$ | 12 |
| $FeSO_4.7H_2O$ | 2 |

CONTROL 1

Minced beef was preserved as in Example 1, except that a deoxidant composition shown in Table 2 below, which did not contain a $CO_2$ gas generating agent, was used in place of the deoxidant-$CO_2$ generating composition used in Example 1. In this experiment, 5 g of this deoxidant composition was sealed in a gas permeable bag.

TABLE 2

| (Deoxidant Composition) | |
|---|---|
| Component | Amount (parts by wt) |
| Fe | 100 |
| NaCl | 5 |
| $H_2O$ | 15 |
| Activated carbon | 1 |
| Zeolite | 50 |

CONTROL 2

Minced beef was preserved as in Example 1, except that neither the deoxidant-$CO_2$ generating agent composition used in Example 1 nor the deoxidant composition used in Control 1 was used in this experiment.

Tables 3 and 4 show the results of Example 1, Control 1 and Control 2 described above.

TABLE 3

| (Color and Flavor of Preserved Minced Beef) | | | | | |
|---|---|---|---|---|---|
| | Analysis | 2 days | 5 days | 7 days | 13 days |
| Example 1 | Color | 4 | 4 | 4 | 4 |
| | Flavor | 5 | 5 | 5 | 3 |
| Control 1 | Color | 1 | 3 | 3 | 3 |
| | Flavor | 5 | 5 | 5 | 3 |
| Control 2 | Color | 3 | 1 | 1 | 1 |
| | Flavor | 4 | 1 | 1 | 1 |

EVALUATION

Color: 4 ... red; 3 ... reddish purple; 2 ... brownish red; 1 ... brown (no reddish tint)

Flavor: 5 ... good beef flavor; 4 ... somewhat good beef flavor; 3 ... slightly putrid smell; 1 ... putrid smell

TABLE 4

| (Gas Analysis within Package) | | | | | |
|---|---|---|---|---|---|
| | Gas Ana. | 2 days | 5 days | 7 days | 13 days |
| Example 1 | $CO_2$ (%) | 16.5 or less | 19.0 | 20.3 | 20.5 |
| | $O_2$ (%) | 0.01 or less | 0.01 or less | 0.01 or less | 0.01 or less |
| Control 1 | $CO_2$ (%) | 0.1 or less | 0.1 or less | 0.1 or less | 0.1 or less |
| | $O_2$ (%) | 0.01 or less | 0.01 or less | 0.01 or less | 0.01 or less |
| Control 2 | $CO_2$ (%) | 2.5 | 14.5 | 19.3 | 31.5 |
| | $O_2$ (%) | 18.0 | 6.3 | 0.1 | 0.01 or less |

FIG. 1 shows the changes with time in the $O_2$ concentration and the $CO_2$ concentration within the package in Example 1.

As seen from Table 3, the minced beef preserved in Example 1 was satisfactory in both color and flavor. It is also seen that the red color of the fresh beef was not maintained in Contol 1 using the deoxidant composition, though it was found possible to maintain the flavor of the fresh beef. On the other hand, Table 4 shows that the oxygen concentration within the package was rapidly lowered in Control 2, reaching 0.1% 7 days later. This is because the beef consumed oxygen as it was putrefied.

Figure 2:
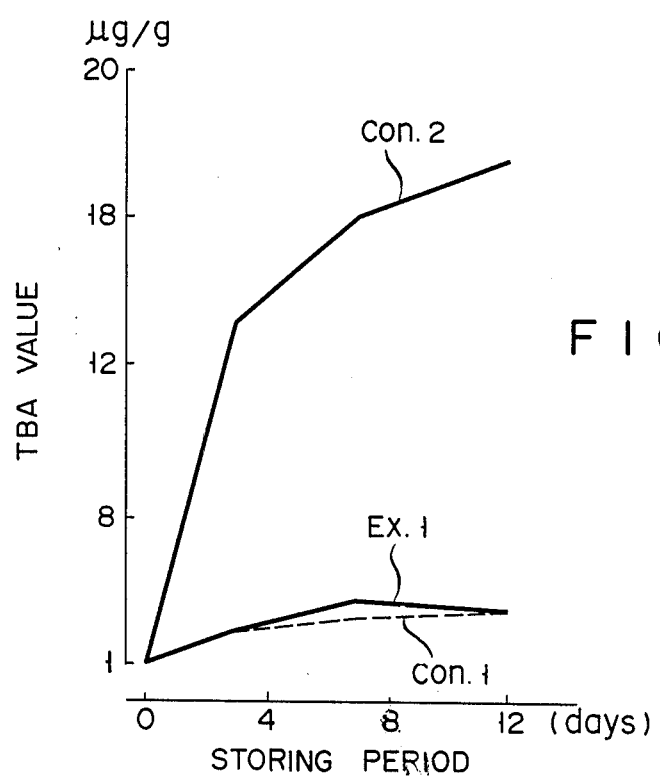
FIGS. 2 to 4 are graphs respectively showing relationships between TBA value, living bacteria and volatile basic nitrogen, and storage period of raw meat.
Figure 3:
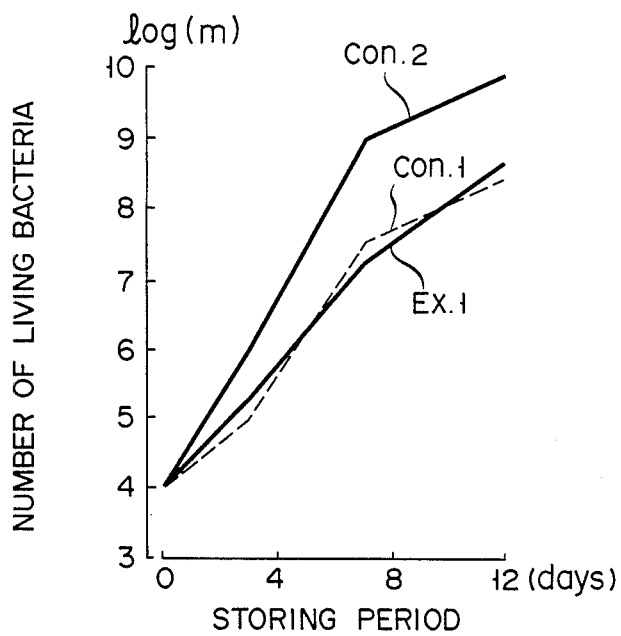
Figure 4:
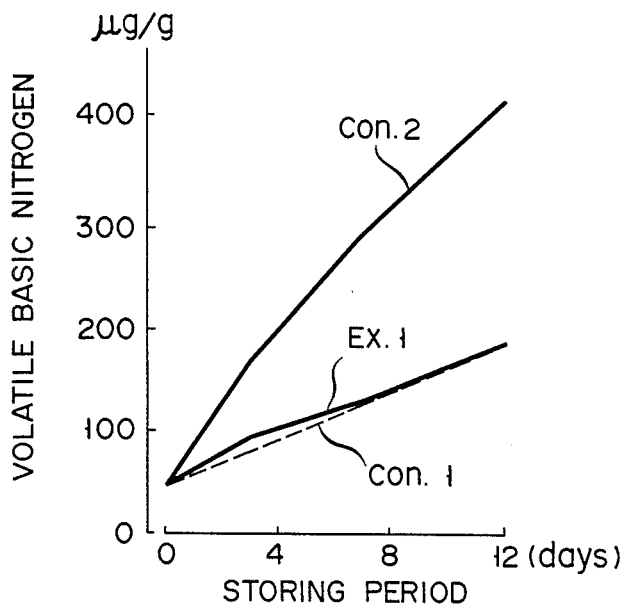

FIGS. 2 to 4 show changes in TBA (thiobarbitaric acid value, living bacteria and volatile basic nitrogen of minced beefs. From these results shown in FIGS. 2 to 4, it is apparent that this invention is very effective in suppressing the oxidation of lipid and spoilage of raw meat.

What is claimed is:

1. A sealed package of raw meat or fish comprising a substantially impermeable vessel, raw meat or fish housed in the vessel, and a deoxidant-$CO_2$ generating agent composition contained in the vessel, the deoxidant-$CO_2$ generating agent composition capable of generating $CO_2$ gas within the vessel immediately after initiation of oxygen absorption by the deoxidant at the rate of 0.2 to 2 mols per mol of oxygen gas absorbed, said deoxidant-$CO_2$ generating agent composition comprising, by weight, 100 parts of iron-based deoxidant, 50 to 100 parts of a metal halide, 10 to 500 parts of a bicarbonate, 5 to 200 parts of a solid acidifying agent, 10 to 200 parts of a pH buffering agent, and 10 to 1000 parts of activated carbon or a zeolite.

2. The sealed package according to claim 1 wherein the deoxidant-$CO_2$ generating composition generates 0.5 to 2 mols of $CO_2$ per mol of oxygen gas absorbed.

3. The sealed package according to claim 1 wherein the deoxidant-$CO_2$ generating agent composition contains as a deoxidant at least one of reducible inorganic materials selected from iron powder and ferrous salts.

4. The sealed package according to claim 1 wherein the iron-based deoxidant is a ferrous salt, the metal halide is NaCl or $CaCl_2$, the bicarbonate is $NaHCO_3$, the solid acidifying agent is fumaric acid or citric acid, and the pH buffering agent is glycine.

5. A method of preserving raw meat or fish comprising storing the sealed package of claim 1 at a temperature of 10° C. or less.

* * * * *